Aug. 4, 1959 R. E. DE COLA ET AL 2,898,563

TURRET TUNER WITH PERIPHERALLY EXTENDING CONTACT CARRYING STRAPS FORMING PART OF TUNED CIRCUIT

Filed Jan. 24, 1955 5 Sheets-Sheet 1

INVENTORS.
Rinaldo E. De Cola
Reuben C. Carlson
Ernest H. Schrot

BY R. Kengel

ATTORNEY

TURRET TUNER WITH PERIPHERALLY EXTENDING CONTACT CARRYING STRAPS FORMING PART OF TUNED CIRCUIT

Filed Jan. 24, 1955 5 Sheets-Sheet 2

INVENTORS.
Rinaldo E. De Cola
Reuben C. Carlson
Ernest H. Schrot
BY R. Kengel
ATTORNEY INVENTORS.
Rinaldo E. De Cola
Reuben C. Carlson
Ernest H. Schrot INVENTORS.
Rinaldo E. DeCola
Reuben C. Carlson
Ernest H. Schrot
BY R. Kengel
ATTORNEY INVENTORS.
Rinaldo E. DeCola
Reuben C. Carlson
Ernest H. Schrot
BY
R. [signature]
ATTORNEY

United States Patent Office 2,898,563
Patented Aug. 4, 1959

2,898,563

TURRET TUNER WITH PERIPHERALLY EXTENDING CONTACT CARRYING STRAPS FORMING PART OF TUNED CIRCUIT

Rinaldo E. De Cola, Park Ridge, Reuben C. Carlson, River Grove, and Ernest H. Schrot, Chicago, Ill.

Application January 24, 1955, Serial No. 483,576
6 Claims. (Cl. 336—142)

The present invention relates to selective tuning devices for electrical apparatus and more particularly, but not exclusively, to tuning devices for high frequency receivers.

In tuning a receiver to the frequency of a station, a tuning device may be adapted to effect controlled selection by the selective substitution of reactive components in the tuning circuits of a receiver.

It has been customary in radio and television apparatus to utilize a rotatable drum as a switching unit for frequency band selection wherein said drum includes a number of panel or strip assemblies holding individual reactances. The strip assemblies are usually releasably secured in position about the periphery of the drum and having contact elements located on the outer periphery for selectively engaging with a stationary contact assembly thereby placing different combinations of reactance components in the circuits of the receiver.

In prior tuning devices, one or more panels or strips including individual reactance components were required for tuning the receiver to each station. Thus, in a receiver for receiving twelve or more stations, a minimum of twelve panels were required on the drum of the tuning device. Other prior tuning devices have attempted to eliminate the complexity of the strip type of tuner, resulting in poorer band-pass characteristics, coupling disadvantages, and the loss of accessibility and replacement advantages of the panel type of tuner device.

The tuning device of the present invention, while retaining the advantages of the panel type structure tuner, simplifies the structure by reducing the number of panels and tuning reactance components, and by other features which will appear more clearly in the description to follow.

An object of the present invention is the provision of a plurality of reactances for tuning circuits, facilitating insertion of the reactances in the circuits to be tuned and substitution of a portion of the reactances.

Another object is to provide a tuning reactance wherein the reactance may be increased for tuning to a lower frequency, simply and economically.

A further object of the invention is the provision of a novel means for changing the reactance of a tuning coil.

Still another object is to provide a structure having a number of tuning reactances with a minimum number of coils wherein selected coils are coupled inductively.

Another object is to provide a structure facilitating accurate and simple tuning of circuits wherein a section of said structure may easily be removed and including a minimum number of parts.

A further object of the invention is the provision of a plurality of tuning reactances in a unitary structure having a lesser number of coils than reactances and wherein a portion of said reactances are easily removable, thereby decreasing the space necessary for a predetermined number of tuning reactances.

A still further object is to decrease the number of coils and supporting structure for a given number of tuning reactances thereby providing space for additional tuning reactances or converter circuits.

Other objects and advantages of the invention will hereinafter become more fully apparent from the following description of the annexed drawings, which illustrate a preferred embodiment, and wherein.

Figures 4, 5, 5A, 6, 6A, 6B, 6C, 7:
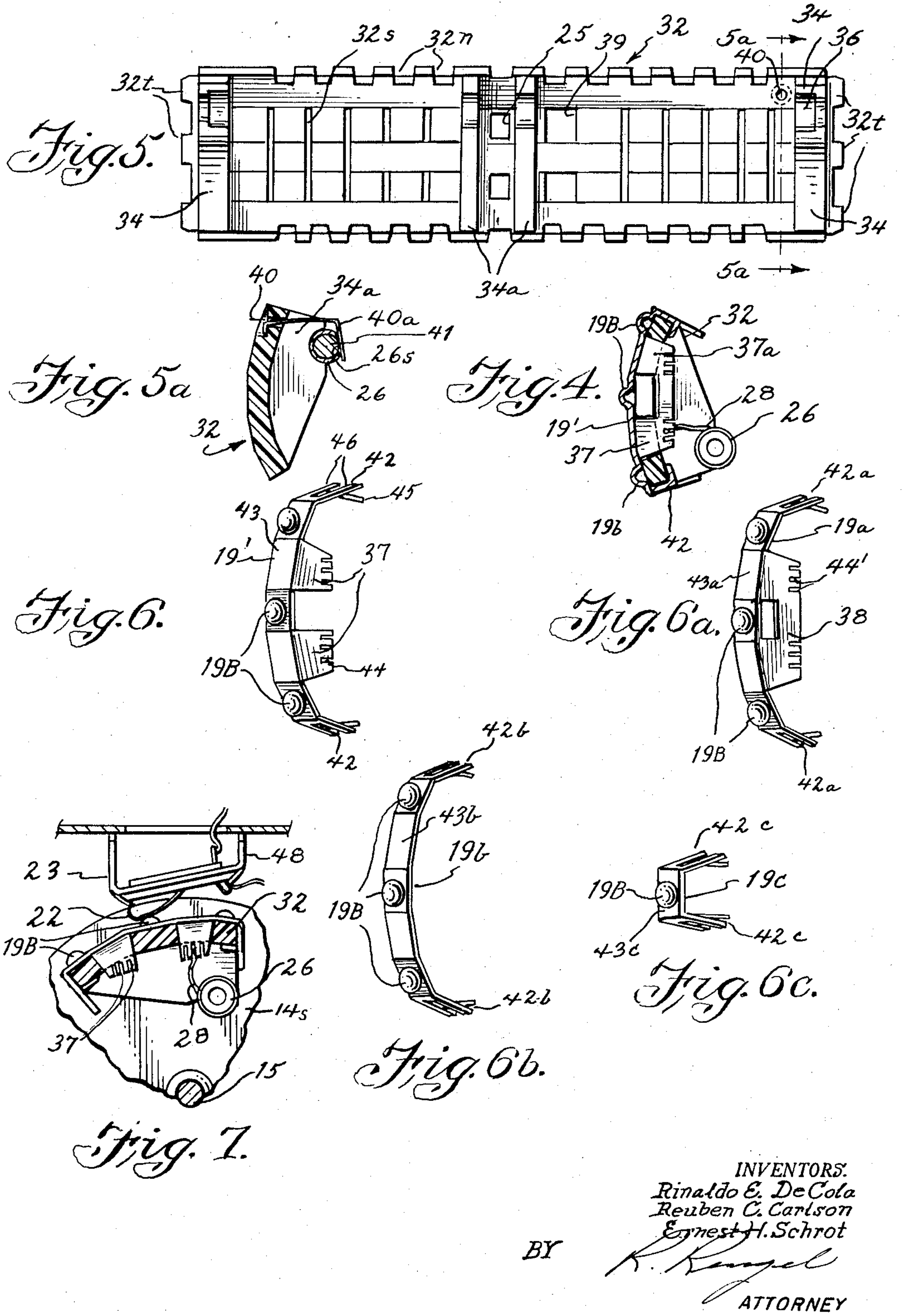
Fig. 4 illustrates one type of contact strap as connected in the coil strip assembly of the tuner drum and is a sectional view taken as indicated by the line 4—4 of Fig. 3.

Fig. 5*a* shows a transverse section of the coil strip form taken on the line 5*a*—5*a* of Fig. 5.

Figure 6D:
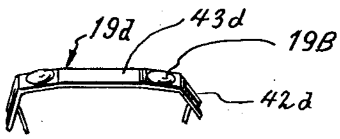
Figure 6E:
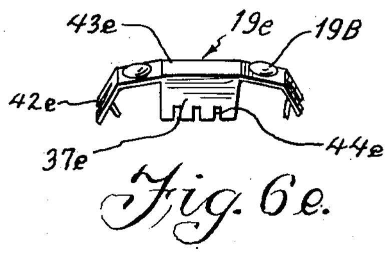
Figure 6F:
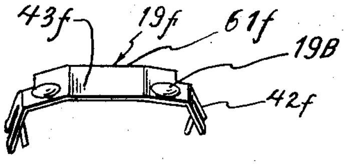
Figure 6G:
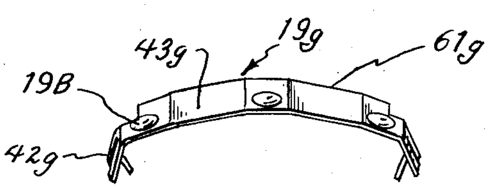
Figure 6H:
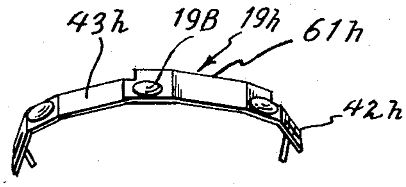
Figure 6J:
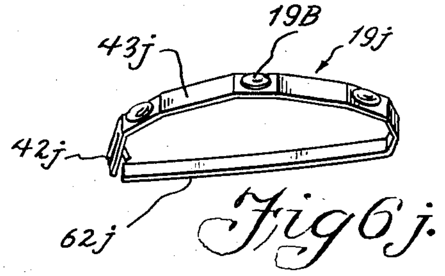
Figure 6K:
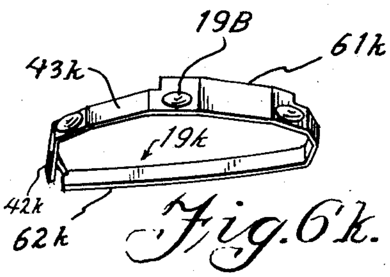

Fig. 6 through 6*k* are perspective views of the contact straps used on the turret or drum assembly of the tuning apparatus.

Fig. 7 is a fragmentary sectional view of a tuner strip assembly mounted in the tuner drum and shown abutting the fixed contacts on the tuner housing.

Figures 8, 9:
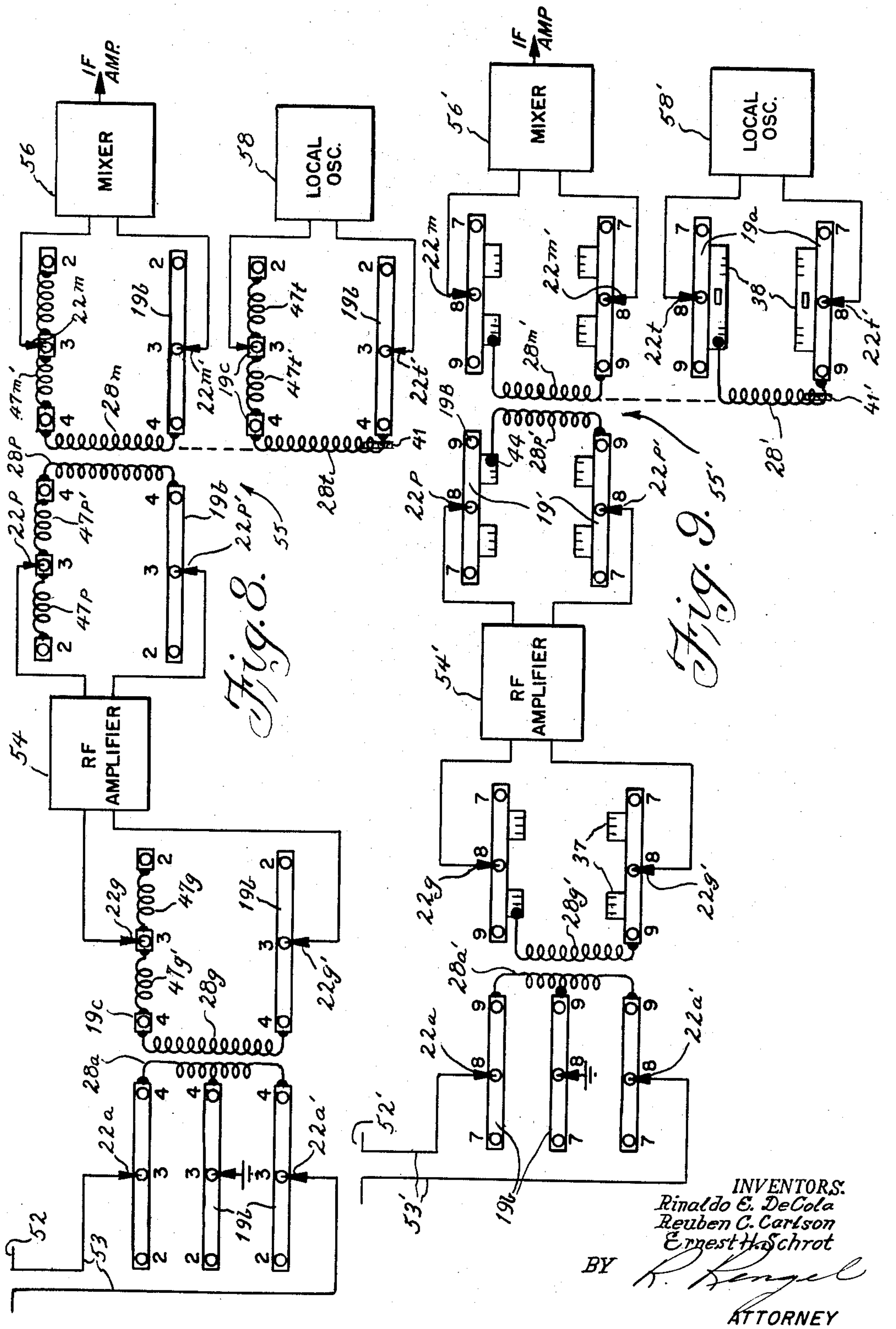

Figs. 8 and 9 are circuit diagrams of a tuner shown partially in block diagram, with certain components omitted for clarity, to illustrate the electrical operation of the tuner apparatus.

Figure 10:
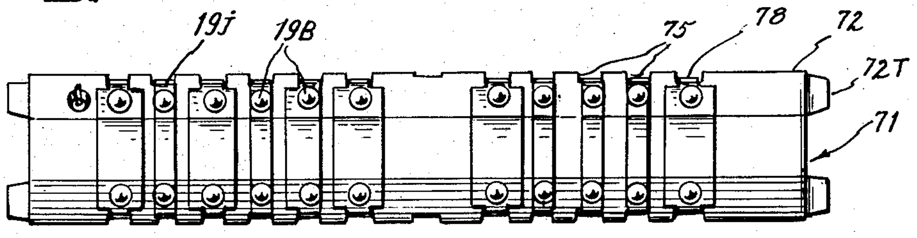
Figure 11:
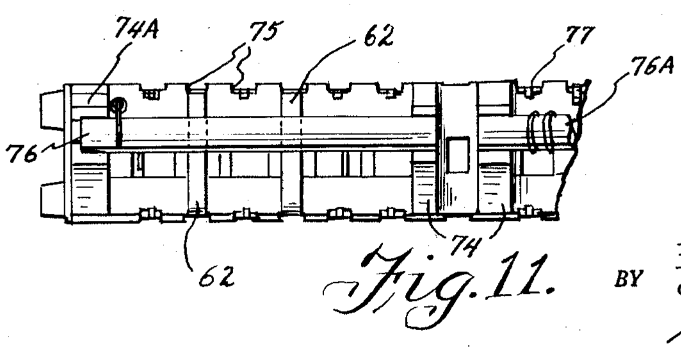

Figs. 10 and 11 are top and partial bottom views of a modified coil strip assembly having tuning reactances for two stations.

Figure 12:
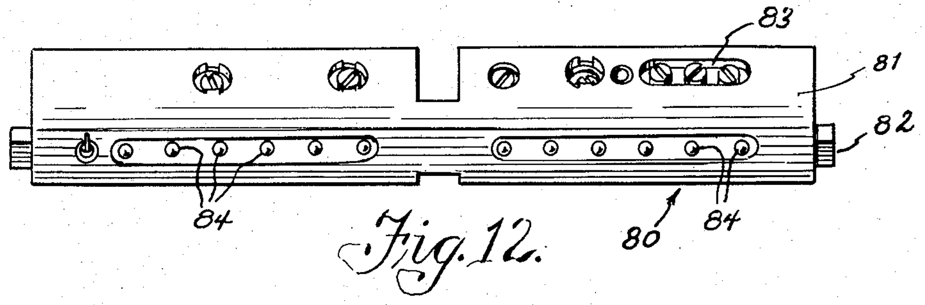
Figures 13, 14:
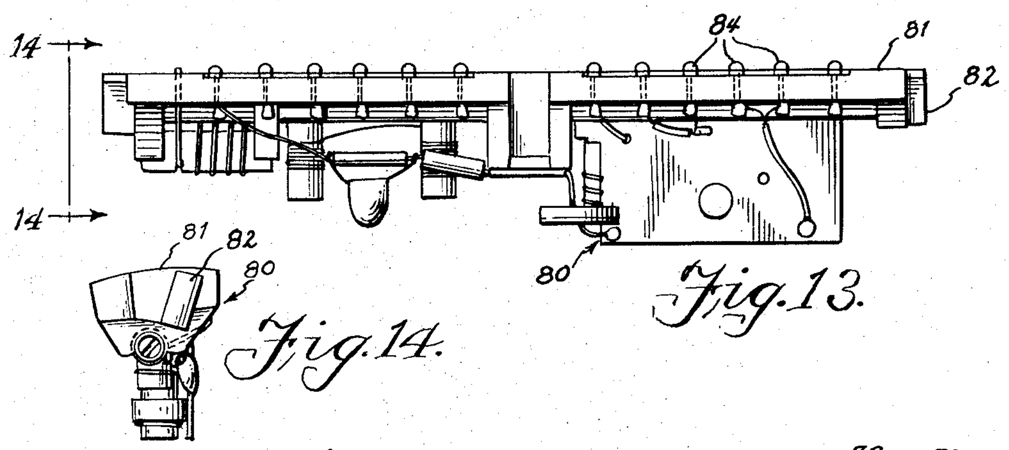

Figs. 12–14 are bottom, side and end views of a converter circuit strip.

Referring now to the drawings, wherein like reference characters designate like or corresponding parts throughout the several views, there is shown in Figs. 1 to 4, a tuning device for selecting one of a plurality of stations or channels of different frequencies comprising a plurality of circuit means, and means for selecting tuning reactances individual to a particular frequency or band of frequencies.

The illustrated embodiment of the invention comprises a rotatable turret or drum and shaft assembly 10 mounted for rotation in a tuner chassis or housing 17 having coil strip assemblies 11 mounted on circular strip retainer discs 12 and 13 and strip retainer and detent plate 14. The strip retainer discs 12 and 13 and detent strip retainer plate 14 have a center extrusion for permanently attaching the discs and plate to the shaft 15 by suitable means such as spot welding or soldering. The drum 10 forms a right circular cylinder and is adapted for rotational movement about the axis of the shaft 15 in response to manipulation of the control knob 16. A spring and roller detent 18 engages with the aligning notches 14*n* between detents in the retainer plate 14, selectively positioning contacts 19B on coil strips 11 in abutting relation with stationary contact springs 22. As will more clearly appear hereinafter the drum 10 carries a number of coil strip or panel assemblies 11, each of which includes tuning and coupling coils for the antenna, RF plate, mixer grid, and the oscillator tank circuits or converter circuit components.

It should be understood that the illustration and description of the inductance are purely exemplary and other components may be readily employed.

*Coil strip assembly mounting*

The coil strip assemblies 11 are aligned parallel to one another and retained at either end by slots 12S, 14S wherein panels or coil strip forms 20 taken together form the periphery of the drum. On each end of the coil strip forms 20 are coil strip end tabs 20T for aligning and retaining the coil strip assemblies 11 in the disc and plate slots 12S and 14S respectively. The end strip retainer disc 12 may be made semi-rigid and having radial slots 21 to permit the insertion of the end tabs 20T of the coil strip forms 20 in plate and disc slots 14S and 12S by applying force to the edge of the disc 12 in a direction allowing the end of the form 20 to pass the edge of disc. Near the center of the coil strips 20 between coil forms 26 and 26A openings 25 may be provided for accommodating the center retainer disc tabs 24 whereby the form 20 is seated on shoulders of tabs 24 and the sides of the openings 25 may be flush with the tabs to prevent movement of the form under stress from any direction, thereby maintaining the alignment of the rows of strap contacts 19B with the stationary contact springs 22 of the bracket assembly 23. Many alternative coil strip form structures for mounting the coil strip assemblies 11 in drum 10 are evident from this disclosure and it should be understood that the description and illustration is purely exemplary, e.g., the coil strips forms may be divided into two or more sections and suitably attached to the strip retainer disc and plates.

*Coil strip or panel assemblies*

It should be noted at this point that although the turret assembly 10 employs few coil strip assemblies 11, more than one station or channel may be selected from each strip even though each strip has only one set of tuning coils 28. This feature of the invention has been devised by providing additional inductance for lower frequency stations or channels, where necessary, than provided by the tuning and coupling coils 28 on forms 26, 26A. For lower frequency channels, e.g., 2–5, this additional inductance is greater relative to the added inductance for higher frequency channels, e.g., 7–13, requiring the use of tuning reactance elements or tuning coils 47 between the tuning coils on the coil forms and the contacts for the respective lower channels. The structure necessary for decreasing the inductance of the contact strap between adjacent higher frequency channels or stations, e.g., 7–13, may take the form of tabs 37 or 38 preferably forming an integral part of the contact strap 19′, as shown in Figs. *6a*–*6k*.

At least two contact straps 19 are associated with each tuning coil 28 to complete the circuit through said coil to the tuner stages of the receiver via stationary contacts 22. The inductance of each tuning coil 28 at the respective strap contacts on the straps 19 may include a portion of the contact strap 19. The tuning of the receiver circuits associated with the tuning coils 28 may be varied by selecting a contact strap having the correct inductance and/or making the appropriate connections to the contact straps 19 thereby providing the correct inductance or reactance for the tuning coil 28 for tuning to the desired frequency.

Figures 1, 2, 3:
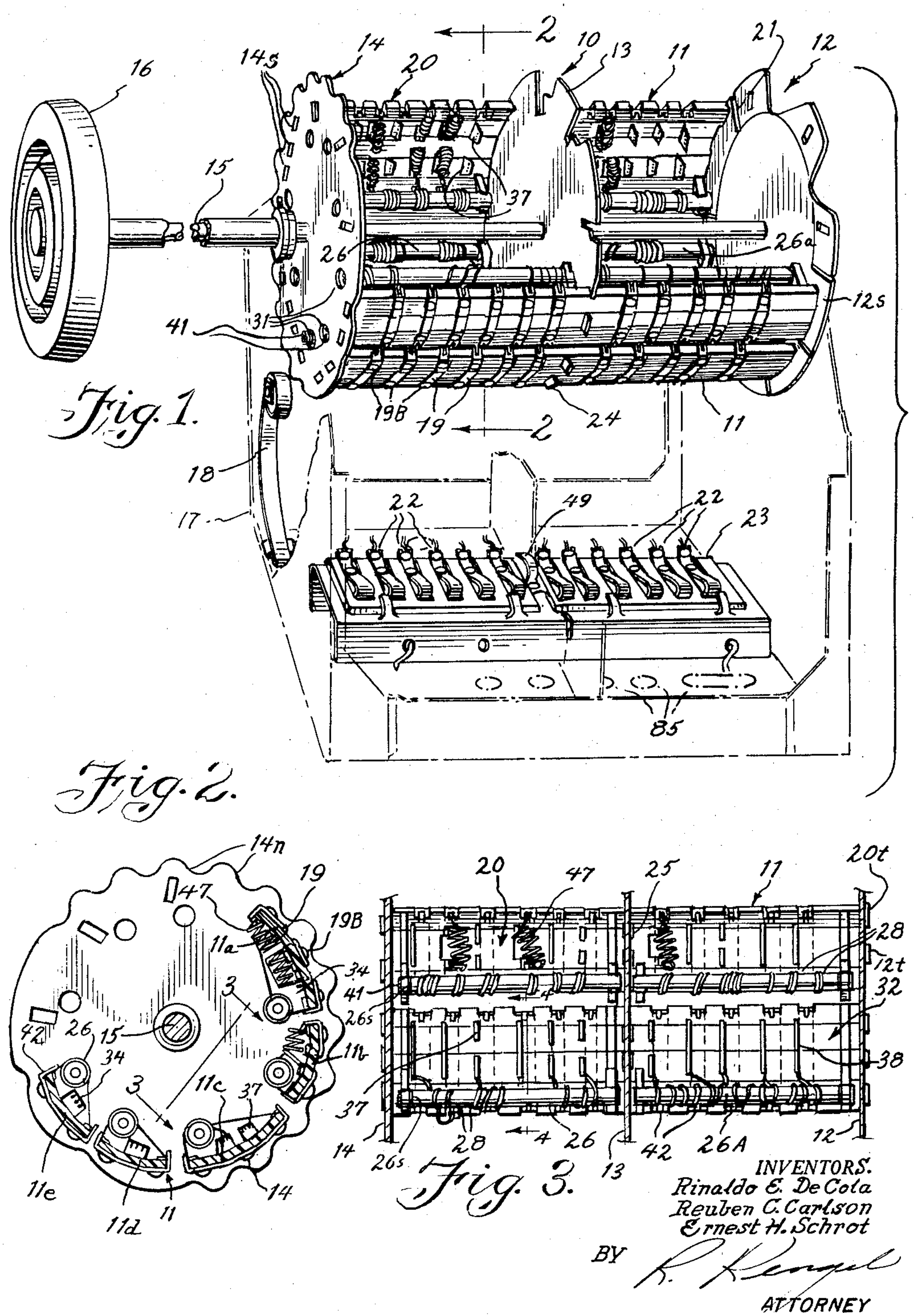
Fig. 1 is an exploded perspective view of the tuning apparatus of the invention showing the tuner drum or turret assembly and components in detail.
Fig. 2 is a sectional view of the turret or drum assembly of the tuner apparatus, taken as indicated by the line 2—2 of Fig. 1.
Fig. 3 is a sectional view of the drum assembly of the tuner apparatus taken along the line 3—3 of Fig. 2.

The coil strip assemblies, shown in Fig. 1 on the drum 10, are shown by way of example, and although each of the coil strips 11 include assemblies which provide reactances for tuning the receiver circuits to either two or three stations, it should be readily apparent that a combination of one or more tuning reactances may be included within a coil strip assembly 11. A wide separation in frequency between adjacent stations on the tuner may determine the size or number of stations allocated to coil strip assembly 11, and although the coil strip assemblies 11 are shown in sequence about the drum 10, they may include reactances for tuning the circuits of the receiver to widely separated frequencies.

As shown in Fig. 1, the contact straps 19 are positioned on the forms 20 to provide a plurality of rows of contacts 19B parallel to the longitudinal axis of the drum 10, wherein each contact is connected to a reactance for tuning the circuits of the receiver to the frequency of the desired station or channel, and a plurality of columns circling the drum, each column of contacts abutting a single stationary contact 22. The description of the coil strip assembly 11 will proceed with the three channel strips 11, wherein the structure will encompass and include the necessary structure for coil strip assemblies of one or more channels.

Fig. 5 illustrates one of the coil strip forms or panels 20 of the coil strip assembly 11 which may be made from insulating material such as Bakelite or other plastics capable of withstanding shock and stresses applied thereto in the insertion of the coil strip in drum 10, or due to rotation of the drum 10 in the chassis 17 (Fig. 1). The coil strip forms, indicated generally by the reference numeral 20 in Figs. 1–4 may take the form of construction shown in Fig. 5. Tabs 32T on either end of the form 32 along with the openings 25 in center sections may be provided for mounting the form on the strip retainer discs 12 to 14. Coil form cross support members 34 and **34*a* adjacent the tabs 32T on either end and center coil form supports may be suitably recessed providing coil seats 36 adjacent one edge thereof for supporting and seating the ends of coil forms 26 and 26A. Slots and openings 32S are formed transversely to the length of the form 32 for accommodating the tabs 37 or 38 of the contact straps 19. Slots 32S may be formed as a single elongated opening in the form or divided into two shorter openings to provide for either type of tab on contact strap 19. A slot 39, having a larger opening, is shown in the form 32 for mounting of the single contact straps 19*c*** (Fig. *6c*) and may be wider than the slots 32S to permit insertion of individual contact straps **19*c*. Notches or cutouts 32N are shown along the longitudinal edges of the coil strip form 32 for seating the legs on individual bifurcated tabs 42 of the contact straps providing a recess for facilitating the positioning and assembly of the contact straps 19** on the form.

The contact straps 19 illustrated in Fig. 6, may be stamped or formed from a sheet of laminated silver, or a sheet of brass or copper, silver plated to provide a minimum of contact resistance to the stationary contact springs 22 (Fig. 1). The tabs 37, by appropriate connection decrease or increase the reactance between the strap contacts 19B or between the associated tuning coil 28 (Fig. 3) and strap contact, and selection of the appropriate slot 44 for a tuning coil connection, provides a variable reactance tap between contacts or between the associated coil and contact. The ends of the contact straps 19 may be formed at right angles to the strap portion 43 and bifurcated to provide a lug 45 for fixing the strap to the panel 32 (Fig. 5) by bending the end of the lug 45 approximately parallel to the strap portion 43 and around the edge of the panel or form. The lug 45, when formed to fix the position of the contact strap leaves legs 46 extending past the inner edge of the coil strip form 32, providing alternate soldering terminals for the associated tuning coil.

Since the tabs 37 of the contact straps 19′ and **19*c*** (Figs. 6 and *6e*) are formed on one longitudinal edge of the contact straps 19, the slots 32S (Fig. 5) may be positioned adjacent to the contact strap permitting the ends of the tabs 37 to pass through the slot 32S. The taps or slots 44 are then made readily available from the inner side of the coil strip form 32 for connection to the tuning coils mounted on the coil forms 26, 26A (Fig. 3).

Both the inductance or change in inductance of the tuning coils 28 for each station or channel may be critical, as indicated by the contact strap structure. In the tuner construction, as pointed out supra, a single set of coils 28 is being used for a tuning to a plurality of stations of different frequencies. Accordingly, the inductance of each tuning coil 28 must be changed between rows of strap contacts 19B to select the desired station frequency. The present invention makes provision for this by selecting a tuning coil 28 having a tuning reactance for a desired station frequency wherein the tuning reactance is increased by additional tuning reactances between contacts, i.e., coils 47 or the inherent reactance of the strap 19 between contacts 19B. However, the inherent reactance of the contact strap between contacts on the contact strap may be too great for higher frequencies. The reactance between strap contacts may be partially decreased by increasing the width or area of the conductor or strap between contacts, e.g., by tabs or parallel straps 62*j* or 62*k* of Figs. 6*j* and 6*k*. A further step in decreasing the reactance between contacts may be made by connecting the coil 28 directly to the tab 37 (Fig. 6) or tab 38 (Fig. 6*a*).

Referring to the section of the coil strip assembly 11 shown in Fig. 4, the coil strip form or panel 32, contact strap 19′, coil form 26 and associated tuning coils 28 are shown having a connection at the tab 37 of contact strap 19′. Connecting the tuning coil 28 directly to the first contact strap tab 37 instead of to the end tab 42 will increase the inductance by increasing the length of the current path to the first contact 19B and decreasing the inductivity of the second contact 19B by decreasing the length of the current path to the second contact. Since the length of the current path to the second contact 19B has been decreased, the length of the current path to the third contact 19B also has been decreased. Thus, connecting the coil 28 to the first tab 37 rather than end tab 42, provides increased tuning reactance at the first strap contact 19B, but a decreased tuning reactance at the second contact by decreasing the change in inductance from first to second contacts 19B. A connection from the coil to the end tab 42 of the strap 19′ will produce the least tuning reactance to the first contact 19B, and the tuning reactance of the strap to the second contact 19B will be increased by the inductivity of the contact strap and first tab 37 between the first and second contacts 19B. The tuning reactance to the last contact 19B on the contact strap will be increased by the inductivity of the portion of the contact strap including the second tab 37 between the second and third contacts, wherein the contacts are enumerated in their order of distance from the end of the contact strap nearest the tuning coil 28.

Located within the end of coil forms 26 may be a tuning slug 41 (Fig. 1) accessible for adjustment through circular openings 31 provided in the detent plate 14 for varying the inductivity of the oscillator tank circuit coil on the associated coil form 26. The tuning slug 41 may be threaded and have a slot in the accessible end thereof, to accommodate a tuning tool for varying the position of the slug inside the coil form over which the oscillator coil is wound.

The arcuate peripheral structure of the coil strip form 32 is shown in the cross-section 5*a* where a wire retainer member 40*a* is shown fitted into bore 40. The bore 40 opens into a counter-bore on the outer periphery of the coil strip form 32 for insertion of wire member 40*a* which is bent along the outer periphery extending through bore 40, bent at right angles above support member 34 into a slot 26*s* of the coil form 26. The portion of the wire 41*a*, fitting into slot 26*s*, retains threaded tuner slugs 41, whereby the slugs may be positioned in the oscillator coils. The wire member, therefore, obviates the need of threading the inner surface or periphery of the coil form 26 and may also function as a retaining member for the coil form 26.

*Contact strap structure*

As should be evident from the description of the operation of the contact strap 19′, the inductance of the corresponding receiver circuit tuning circuits at the first and second contacts of the contact strap may be varied also by selecting the desired length of current path by choosing the appropriate tap or slot 44 on the tab 37. The structure of the contact strap 19′ may limit its use at higher frequencies, e.g., the inductance of the strap between the second and third contacts may be too large for the change in frequency.

Fig. 6*a* illustrates a contact strap 19*a* having a tab 38 for further decreasing the inductance between the second and third strap contacts 19B. Should the effective tuning reactance at the second contact of the strap 19′ be correct, but the tuning reactance at the third contact be too large for tuning to the frequency of the associated station, means for decreasing the tuning reactance to third contact must be provided. The tab 38 of the contact strap 19*a* makes provision for decreasing the inductance of the contact strap 19′ between the second and third contacts. The tab 38, in addition to making a direct connection to the third contact from the tuner coil tap 44′ on tab, also increases the cross-sectional area of the conductor between the coil 28 tap and the third contact. The inductance of the tuning coil 28 at the contacts 19B may be controlled by selection of the correct tap 44′.

Fib. 6*b* illustrates another type of contact strap for the contact strip form or panel 32 (Fig. 5) and may provide tuned circuits for different frequency stations between strap contacts 19B by the inherent inductivity of the contact strap material between contacts added to the reactance of the tuning coil 28. As pointed out in the general description, the conventional strip type tuner provides individual coils for each tuned circuit of each station or channel. The contact straps of the present invention provide a simpler and more economical structure by using the same coils for at least two stations of different frequencies. Mounting the contact strap 19*b* on the coil strip form 32, and connecting the tuner coil 28 to one end tab 42*b* of the contact strap 19*b* provides a tuned circuit for each pair of contacts in a row on the drum connected to the same tuning coil 28; each pair differing in tuning reactance according to the inductivity of the strap material between contacts, e.g., for certain frequencies it has been found that a strap portion approximately 7/16″ in length, .125″ wide, and .017″ thick, separating the contacts, will increase the tuning reactance of the tuning coil 28 and decrease the resonant frequency of associated receiver circuits 6 mc.

Fig. 6*c* shows a single contact button strap 19*c*, intended for use where a coil or relatingly larger reactance may be necessary between contacts 19B in coil strip assemblies 11 (Fig. 1) for changing the tuning reactance of the coils 28 at lower frequency stations or channels. One to three single contact straps 19*c* may be assembled in a column on the coil strip form 32, to provide contacts for three adjacent stations or channels. Tuning coils 28 for the associated tuner circuits may be connected to the straps 19*c* and coils 47 to provide reactance necessary between straps 19*c* for adjacent stations or channels. The connection between single contact straps 19*c* is more clearly illustrated in Fig. 2, coil strip assembly 11*a*.

Fig. 6*d* illustrates the contact strap used on the two-station strip or panel coil assembly 11, shown in Figs. 1–3, particularly, coil assemblies 11*b*, 11*d*, and 11*e* shown in Fig. 2. Contact strap 19*d* is similar to strap 19B, with the exception that the structure is limited to two strap contacts 19B, having a strip or body portion of suitable length for attachment to the narrower coil strip forms or panels 20. The strap 19*d* includes a pair of strap contacts separated by an increment of the arcuate body or strip portion 43*d*. End portions 42*d* of the contact strap 19B are bifurcated, providing a center lug portion and remaining legs along the longitudinal edges of the strap for securing the strap to the two-station coil assemblies 11. Although the strap increment between contacts 19B may be uniform, the reactance of the strip 43*d* between the contacts provides the change in tuning reactance between contacts for coil connected to either end. The contact strap illustrated in Fig. 6*e* corresponds to the contact strap of Fig. 6 and is suitable for use in a two-frequency coil strip assembly, e.g., coil assemblies **11*b*, 11*d*, and 11*e* of Fig. 2. A contact strap 11*e* includes an arcuate body or strip portion 43*e*, conforming to the arcuate surface of form 20, having contacts 19B spaced to correspond to the rotation of the drum 10 between detents, and a tab portion 44*e* integral therewith and at right angles to the plane of said strip. Slots 37*e* are shown at the outer edge of the tab 44*e* for selectively connecting a tuner coil 28, whereby the effective reactance of the coil to the contacts 19B may be adjusted by varying the length of the current path thereto. Bifurcated end portions 42*e* provide additional tap terminals for connecting the tuner coil 28 in preference to the slots 37*e*,** where the entire reactance of the strip and tab between contacts is desired.

Fig. 6*f* illustrates a contact strap **61*f* for a two-frequency coil assembly 11, having two contacts 19B at the ends of the contact strip portion 43*f*. Bifurcated end portions 42*f* provide means for securing the strap to the two-frequency coil form 20 and terminals for connecting the tuner coils at either end thereof. Contact strap 19*f* differs from the strap 19B by including a contact strap tab 61*f* formed integral with the strip or body portion 43*f*, and functions to decrease the reactance between contacts 19B maintaining uniform spacing between contacts 19B. The showing in this figure is intended to be exemplary, for it should be evident that the function may be accomplished equally as well by widening either side of the strip 43*f* to decrease the reactance between contacts 19B** without varying the spacing.

The contact strap of Fig. 6*g* is intended for use in the three-frequency coil assemblies 11, e.g., **11*a* and 11*c* of Fig. 2. Contact strap 19B includes a widened, longitudinally arcuate strip portion 43*g*, having three equally spaced contacts wherein the widened strip or tab portion 61*g*** decreases the reactance between contacts. End portions 42*g* at the ends of the strip provide terminals for connecting the ends of the associated tuner coil 28.

A modification of the contact strap **19*g*** is shown in Fig. 6*h*, wherein the contact strap **19*h* includes a tab portion 61*h* for decreasing the tuning reactance change between two of the three strap contacts 19B. The tab portion 61*h* of contact strap 19*h*** facilitates the provision of only a single strap for three tuning reactances where the desired reactance change between contacts is not uniform.

Another form of contact strap **19*j*** is shown in Fig. 6*j* which provides means for decreasing the reactance between all contacts 19B. A parallel strip portion **62*j* is formed integral with one end of the contact strap and is connected to the other end 42*j* of the strap and a tuner coil 28, thus forming a parallel path for high frequency currents from the tuner coil to the contacts 19B. Parallel strip 62*j* is connected to the end of 42*j* after being fitted into notches 32*n* (Fig. 5) and wrapped around the coil form 32. Contact strap 19*j* decreases the reactance between contacts 19B by providing a parallel current path from the tuner coil connection at end tab 42*j*, and secures the strap from radial and circumferential displacement on the coil panel 32.**

A modification of contacts strap **19*j* is shown in Fig. 6*k*, wherein a tab 61*k* is shown for widening the strip between two-contacts 19B** and decreasing the change in tuning reactance between said contacts.

Contact strap **19*k* combines the features of contact straps 19*h* and 19*j* by providing a parallel strip 62*k* and tab 61*k* for decreasing the change in tuning reactance between contacts 19B.**

It will be understood that the illustration and description of the contact straps are purely exemplary and other straps or connections could be readily employed to perform the functions intended.

*Contact bracket assembly*

Fig. 7 shows the position of the contact bracket assembly 23 in relation to the rotatable drum assembly 10 and coil assembly 11. The bracket assembly 23 is positioned to one side of the longitudinal center line of the housing 17 on the top plate thereof to provide space for accommodating tuner and receiver circuit components. The strap contacts 19B abut the stationary contacts spring 22 to the left of a vertical line drawn through the drum shaft. Positioning of the bracket assembly, to provide space for components on the top plate of the housing 17 (Fig. 1), may necessitate the location of the stationary contacts springs, as shown in Fig. 7, wherein a bracket assembly 23 has a spring support member 48 at an angle with the top plate of the housing 17 to lower only a portion of stationary contact in abutting relation to the strap contacts and space the remainder of the bracket assembly 23 from the drum 10. The location of the detents on the plate 14 selectively position the drum and the rows contacts 19B in abutting relation with the stationary springs upon rotation of the drum 10. In addition to the stationary contacts 22 for the antenna tuning coils **28*a* (Fig. 8) and coils 28 of the tuner stages, a contact spring 49 is positioned on the bracket assembly 23 for riding on the center strip retainer disc 13 providing a ground connection for the coil strip assemblies 11.**

*Circuitry*

The electrical circuits shown in Figs. 8 and 9 are of a known type and are taken by way of example in illustrating two positions of the tuner switch of the invention. As shown in Figs. 8 and 9, the dipole antenna 52 is coupled to the RF amplifier 54 through the transmission line 53 and the antenna coupling network. This network includes balanced input impedances through a center tapped antenna input coil or primary winding **28*a* inductively coupled to the input coil 28*g* of the RF amplifier 54. The RF amplifier may be coupled to the detector or mixer 56 by the coupling network 55 comprising the RF output coil or winding 28*p* inductively coupled to the mixer input coil 28*m*. The local oscillator 58 is provided with a tank circuit coil 28*t*, inductively coupled to the RF plate and mixer coils 28*p* and 28*m*.**

Radio frequency signals, intercepted by the antenna 52, are selectively applied to the RF amplifier section 54 by the tuned circuits of the antenna coupling network. The RF output signal of amplifier 54 is applied to the mixer or converter section 56, by way of a coupling network 55. The signal generated by the local oscillator 58 is injected into the grid circuit of the mixer or converter section 56 by the mutual inductance between the windings **28*t* and 28*m*. Mixing of the local oscillator and high frequency signals produces an intermediate frequency signal in the output circuit of the mixer section 56,** the frequency of which is equal to the difference between the frequencies of the two applied signals. The intermediate frequency signal may then be applied to the following stages of intermediate amplifiers in any convenient manner. Inasmuch as the invention does not directly relate to the foregoing known circuits, except in so far as they cooperate with the tuning and selective apparatus of the present invention, and since the tuning and selective apparatus is also applicable to other electrical circuits, a further detailed description of the circuits of the receiver will not be included herein.

Throughout Figs. 8 and 9, the number of the station is indicated beside each contact, e.g., Fig. 8, stations #2, #3, and #4; Fig. 9, stations #7, #8, and #9, wherein the higher station number indicates a higher frequency station. Rotation of the drum assembly 10, positions a row of strap contacts 19B contiguous to the stationary contacts 22. It should be further understood that stationary contacts **22*a*, 22*p*, 22*m*, and 22*t*, although shown in Figs. 8 and 9 in different locations, are preferably located in a row as shown in Fig. 1. Rotation of the drum assembly 10 of the tuner will connect the respective row of strap contacts 19B to the stationary contacts 22** and the associated tuner circuits.

Referring now to the antenna coupling network shown in Fig. 8, an antenna coil 28*a* is provided for matching the impedance of the antenna and is connected to the transmission line 53 by contact straps 19*b* and stationary contacts 22*a*. The center tap connection to ground by a third contact strap 19*b* provides a balanced input to the RF amplifier circuit for elimination of noise and shunting out static voltage built up in the antenna circuit. The antenna input is shown by way of example only and is not intended to restrict the application of the tuning selection apparatus as described herein.

The antenna coil 28*a* is closely coupled to the input coil 28*g* and having a turns ratio for matching the impedance of the antenna to the input impedance of the RF amplifier. Contact strap 19*c* of station #3 is shown connected to the contact strap 19*c* of station #3 by a coil 47*g'* for increasing the tuning reactance of the coil 28*g* whereby the input circuit of the RF amplifier is tuned to the lower frequency of station #3. The stationary contacts 22*g*, 22*g'* connect the contact straps of the input coil 28*g* to the RF amplifier 54, having an output and tuning coil 28*p*. Coil 28*p* is shown connected to the output of the RF amplifier 54 by contact straps 19*c* and 19*b*, coil 47*p'*, a portion of contact strap 19*b*, stationary contacts 22*p*, 22*p'*, wherein coil 47*p'* increases the tuning reactance of the amplifier output coil, tuning the amplifier output circuit to the frequency of station #3. The RF signal is inductively coupled to the mixer section 56 by the tuner coil 28*p* and the mixer input coil 28*m*. The mixer input coil 28*m* is shown connected to contact straps 19*c* and 19*b* and fixed contacts 22*m*. The coil 47*m'* connected between the contact straps 19*c* increases the inductance of the mixer input circuit and/or the mixer input coil 28*m*, thereby tuning the mixer input circuit to the frequency of station #3. The frequency of the local oscillator 58 may be controlled by the inductance of the tank coil 28*t*, which is adjusted to the oscillator frequency of station #3 by the coil 47*t'* connected between the contact straps 19*c* of stations #4 and #3. Additional variation in inductance in the tank circuit may be provided by adjustment of the oscillator tuning slug 41 adjustably positioned in the end of the oscillator coil 28*t*.

From the foregoing it should be evident that rotation of the tuner drum assembly selectively positions the rows of contacts 19B of the respective stations in opposition to the stationary contacts 22, whereby the tuning of the receiver circuits will be varied according to the inductance of coils 47 and contact straps 19 between strap contacts 19B. Since the tuner coils are connected at either end by contacts straps 19*c* and 19*b*, the inductance of the coil 28 will be increased or decreased not only by the coils 47, but also by the inductivity of the contact strap 19*b*. Additional capacitive coupling between coils 28*p* and 28*m* of the coupling network 55 may be provided, when necessary, by connecting a coupling condenser between the tuner coils.

In the description of the operation of Fig. 8 it was pointed out that the coils 47 adjusted the tuning of the coils of Fig. 28 to the frequency of station #3. It should be further understood that the coils 47' between contact straps 19*c* effectively increase the inductance in tuning coil 28 to the frequency of station #2. Initially coils 28 are tuned to the desired frequency, however, the inductance or tuning reactance of coil 47 and contact strap 19*b* between the strap contacts 19B of stations #4 and #3 change the tuning of impedance of the coil 28 to the lower frequency of station #3, but only at the strap contact for station #3. The inductance of coil 47 and the strap 19*b* between the strap contacts of station #3 and #2 increases the inductance of the coil 28 at the strap contacts 19B for station #2, thereby tuning the coil 28 to the lower frequency of station #2.

Fig. 9 illustrates a tuner circuit for higher frequency stations than shown in Fig. 8, wherein an increased inductance between stations, for tuning the receiver circuits, may be provided for by the inherent reactance of contact straps 19' and 19a shown in Fig. 6 and 6*a*. Signals intercepted by antenna 52' may be coupled to the RF amplifier 54' through the balanced input antenna coupling network of the input antenna coil 28*a'* and RF amplifier input coil 28*g'*. The output signal of the RF amplifier may be coupled to the converter or mixer 56' through the coupling network 55'. The signal output from the local oscillator 58' may be injected into the input circuit of the converter or mixer section 56' by the mutual inductance between the tank coil 28*t'* and mixer input coil 28*m'*.

The tuning of the RF amplifier input circuit or inductance of the coil 28*g'* may be varied by selecting a tap on tab 37 of the contact straps 19'. The stationary contacts 22 are shown connected to the contacts 19B for station #8, therefore, the tuner circuits will be tuned to the frequency of station #8 by the connections to the contact strap as shown. The coupling network 55' illustrates an adjustment of the inductance of the tuner coils 28' by connecting the coils to the contact straps 19' at the taps or slots 44 on tab 37 at one end of the tuner coil 28'.

The receiver circuits of Fig. 9 may be tuned to the frequency of stations #7, #8, and #9 by selection on the contact straps 19' and 19*a* the proper taps for connecting the straps to the tuner coils 28. Assuming the assigned frequencies increase with higher numbers, connecting an end of the coil 28 to the strap tab 37 of contact strap 19' will increase the inductance of tuner coil 28 to the adjacent strap contact 19B, of station #9 by the inherent inductance in the contact strap between the tap 44 and the strap contact 19B. This arrangement may be necessary where the inductivity of the contact strap 19' is too large between strap contacts 19B for stations #8 and #9. For example, connecting the ends of the coil 28 to the contact strap end tab 42 may provide the proper inductance for tuning the coil to station #9 by controlling the inductance of the coil 28, but the increase in inductance of the tuner coil 28 due to the inherent inductivity of the contact strap between the tab 42 and the contact for station #8 may provide too great an increase in the inductance of tuner coil 28 for tuning to the frequency of station #8.

Since station #7 is of a lower frequency than station #8, the additional inductance occurring between the strap contacts of stations #7 and #8 may be proper for tuning the coil 28 to the frequency of station #7. Should the additional inductance of the contact strap 19' between contacts for stations #7 and #8 be too large for tuning to the frequency of station #7, a contact strap 19*a* may be substituted for contact strap 19', thereby decreasing the inductance between strap contacts for station #7 and #8. As pointed out supra, the contact strap 19*a* by the construction of the tab 38 decreases the inductance between contacts for stations #7 and #8 by increasing the straps cross-sectional area and thus increasing the conducting path between the tuner coil 28 and the strap contact 19B for station #7.

*Modified coil strip assemblies*

The coil strip assembly 71 shown in Figs. 10 and 11 includes tuning reactances in a structure particularly suitable in the drum or turret assembly of Fig. 1. Coil strip assembly 71 is a modification of the coil strip assemblies 11, employing contact straps which may have either a wider strip between contacts or parallel straps. Contact straps 78 are secured at both ends to the arcuate coil strip form or panel 72 by the contact strap end tabs 77, having lugs pressed into transversely aligned notches 75 and both edges of the panel 72. Contact straps 19*j'*, including a parallel strap portion 62, may be secured to the panel 72 in notches 75 along the longitudinal edges of said panel 72 by spreading the open end of the contact strap to allow the strap to girdle the panel and seat in transversely aligned notches. The adjacent end portion may be soldered to the end of the parallel strap upon press closing of the ends, thereby permanently securing the strap to the panel 72. Either type of contact strap shown may decrease the inductance reactance of the strap between contacts 19B for tuner coils connected to the end portions 77.

Coil forms 76 and 76A are visible in the bottom view of the coil strip assembly 71 supported by lateral coil support members 74, 74A in seats 77 formed in said supports. Positioning of the coil forms and coils may provide clear access to the contact strap and tabs for soldering the tuner coil leads to the lugs and/or legs of the contact strap included in said end tabs. However, the side of the panel upon which the coil forms are mounted may be controlled by desired lead length of the tuner coils. The parallel strap portion of the contact strap **19*j'* is visible in Fig. 11, except for the portion shown in dotted lines passing between the panel 72 and the coil form 76. The straps 19*j'* provide less inductance between contacts 19B than the straps 78, having a wider strip portion between contacts 19B. The remaining structure, including the panel end tabs 74, perform the same function as the panels heretofore described, i.e., are releasably attached to the end discs of the drum 10 in the slots 14*s*. Since the widened or parallel contact straps described herein do not have tab portions passing through the panel, the need for lateral slots 32*s* in the panel 32** is obviated.

*Misc. panel assemblies*

The panel assembly shown in Figs. 12–14 provides mounting means for intermediate frequency coils or converter circuits. Panel 81 comprises a form made from insulating material, e.g., plastic, having end tabs 82 fitting into end disc slots 12S and 14S releasably attaching the assembly in the end discs 12 and 14 of the drum 10 (Fig. 1). A single end tab 82 at either end of panel 81 is seated in a slot in each disc 12 and 14. Referring to Fig. 1, where a portion of the drum does not have panels inserted therein, a suitable space is provided for accommodating panel assemblies of this type.

Portions of the panel, on the outer arcuate surface, are recessed to accommodate tuning slugs 83 and contacts 84, wherein contacts 84 extend above the outer surface for engaging stationary contacts 22, thereby connecting the components of the converter circuit to the receiver. Additional support members are provided on the inner surface of the panel for mounting converter circuit components 80 for lowering the frequency of the received signal to the receiver frequency range. The supporting structure on the inner surface of panel 81 may be modified to accommodate various circuitry, in particular, intermediate frequency coils and circuitry. The converter and intermediate frequency circuits are well known in the art and do not comprise a part of the invention per se, wherein a further description is deemed unnecessary.

To afford access to the tuning slugs 83 for adjustment, a plurality of alignment holes and/or slots 85, shown in Fig. 1, are provided in the housing 17 adjacent the contact assembly 23. Upon alignment of the panel 81 with holes 85, a tuning wrench may be inserted through said holes to engage the tuning slugs for adjustment.

Various modifications are contemplated and may obviously be resorted to by those skilled in the art without departing from the spirit and scope of the invention, as hereinafter defined by the appended claims, as only preferred embodiments thereof have been disclosed.

We claim:

1. In a turret-type tuner a drum-like structure comprised of a plurality of retainer discs arranged substantially parallel with respect to each other and spaced apart along a common axis, a plurality of coil strips mounted upon said retainer discs near the periphery thereof and spanning the distance between said retainer discs, a plurality of tuning circuits mounted on each of said coil strips, each of said tuning circuits comprising a plurality of contacts, said plurality of contacts being arranged in at least two rows and at least two columns substantially perpendicular to said rows, inductive means for connecting together adjacent contacts in a given column of contacts, a tuning coil connected across a selected pair of the contacts in a given row of contacts, a bank of second contacts, and means for engaging individual contacts of said bank of second contacts substantially simultaneously with individual contacts in any given row of contacts, said rows of contacts and said bank of second contacts being arranged so that each individual contact of said bank of contacts will engage only the contacts in an individual column of contacts.

2. In a turret-type tuner comprising a tuning coil, a rotatable shaft, and retainer discs concentrically mounted on said rotatable shaft and spaced apart, at least one coil strip supported by said retainer discs and spanning said retainer discs, a plurality of circuits mounted on said coil strip, each of said circuits comprising at least two rows of contacts mounted on said coil strip, each row of contacts being substantially parallel with and equidistant from said rotatable shaft, the contacts in said rows of contacts being positioned to form curvilinear columns of contacts which lie in planes substantially perpendicular to said rotatable shaft, inductive means for connecting together adjacent contacts of a given column, said tuning coil being connected across a selected pair of the contacts in a given row of contacts, and a row of stationary contact means individually arranged and positioned to make contact substantially simultaneously with the contacts in any given row of contacts.

3. A turret-type tuner in accordance with claim 2, in which some of said inductive means comprise a strip of conductive material having an inherent reactance at high frequencies, the magnitude of which varies in accordance with the dimensions of said strip of conductive material.

4. A turret-type tuner apparatus comprising a rotatable shaft, retainer discs spaced apart and mounted concentrically upon said rotatable shaft normal to the axis of said rotatable shaft, at least one coil strip means for mounting said coil strip near the periphery of said retainer discs and in spanning relation between said discs, at least one reactive component mounted on said coil strip form, at least one contact strap of conductive material connected to said reactive component and having at least two strap contacts on the outer surface thereof, means for attaching said contact strap to said coil strip form, said contact strap being positioned on said coil strip form whereby the strap contacts lie in a row equidistant from said rotatable shaft and in a plane perpendicular to the axis of said rotatable shaft, and at least one stationary contact positioned for sequentially engaging the strap contacts of a given contact strap.

5. A contact strap for a tuner device of the type described comprising an elongated and substantially arcuate strap of conducting material having lugs at both ends thereof for attaching said strap to a substantially arcuate surface, a strip of conductive material connected between the ends of said contact strap and in parallel therewith, at least two contact points on the surface of said strap each comprising a raised portion on the surface of the contact strap, and at least one tab portion integral with and extending from an edge of said strip.

6. In a turret-type tuner apparatus comprising a rotatable shaft, retainer discs spaced apart and mounted concentrically upon said rotatable shaft normal to the axis of said rotatable shaft, at least one coil strip, means for mounting said coil strip near the periphery of said retainer discs and in spanning relation between said discs, at least one reactive component mounted on said coil strip form, at least one contact strap of conductive material connected to said reactive component and having at least two strap contacts on the outer surface thereof, means for attaching said contact strap to said coil strip form, said contact strap being positioned on said coil strip form whereby the strap contacts are circumferentially displaced about the drum and lie in a plane perpendicular to said rotatable shaft, and at least one stationary contact positioned for sequentially engaging the strap contacts of a given contact strap.

References Cited in the file of this patent

UNITED STATES PATENTS

| | | |
|---|---|---|
| 1,818,126 | Germain | Aug. 11, 1931 |
| 1,913,617 | Smith | June 13, 1933 |
| 2,103,035 | Lear | Dec. 21, 1937 |
| 2,496,183 | Thias et al. | Jan. 31, 1950 |
| 2,551,228 | Achenbach | May 1, 1951 |
| 2,584,176 | Wingert | Feb. 5, 1952 |
| 2,643,361 | Mackey | June 23, 1953 |
| 2,627,579 | Wasmansdorff | Feb. 3, 1953 |
| 2,693,581 | Osborn | Nov. 2, 1954 |
| 2,718,623 | Yoder et al. | Sept. 20, 1955 |
| 2,774,880 | Fulmer | Dec. 18, 1956 |
| 2,778,943 | Blonder | Jan. 22, 1957 |